Dec. 16, 1969     E. C. MILLER     3,483,911
TIRE TRIMMING DEVICE
Filed Oct. 11, 1967     2 Sheets-Sheet 1
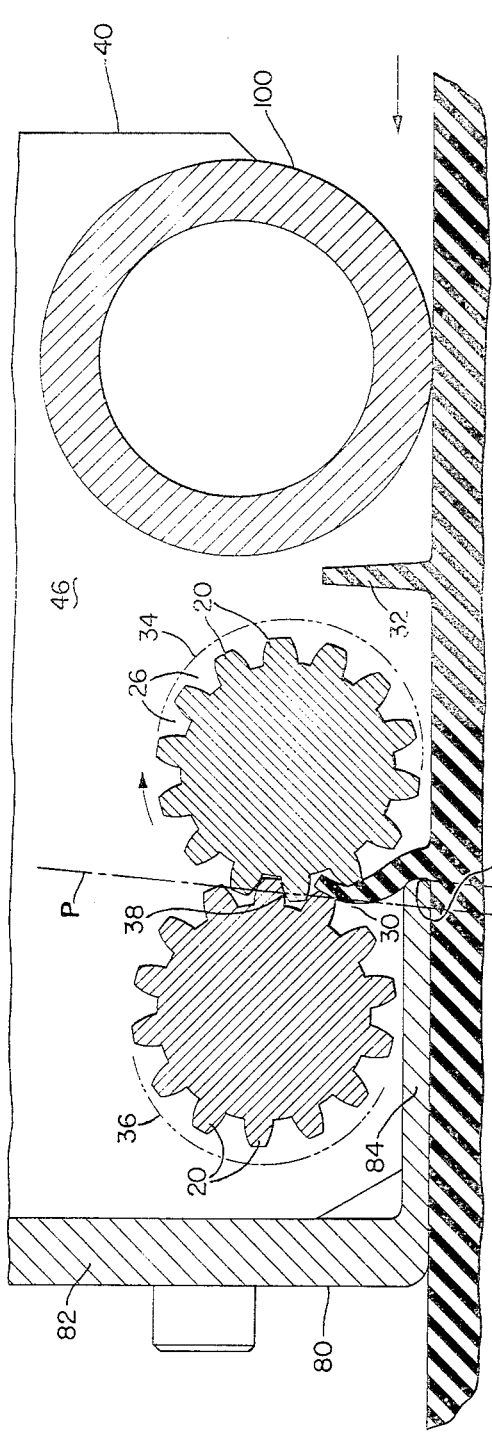
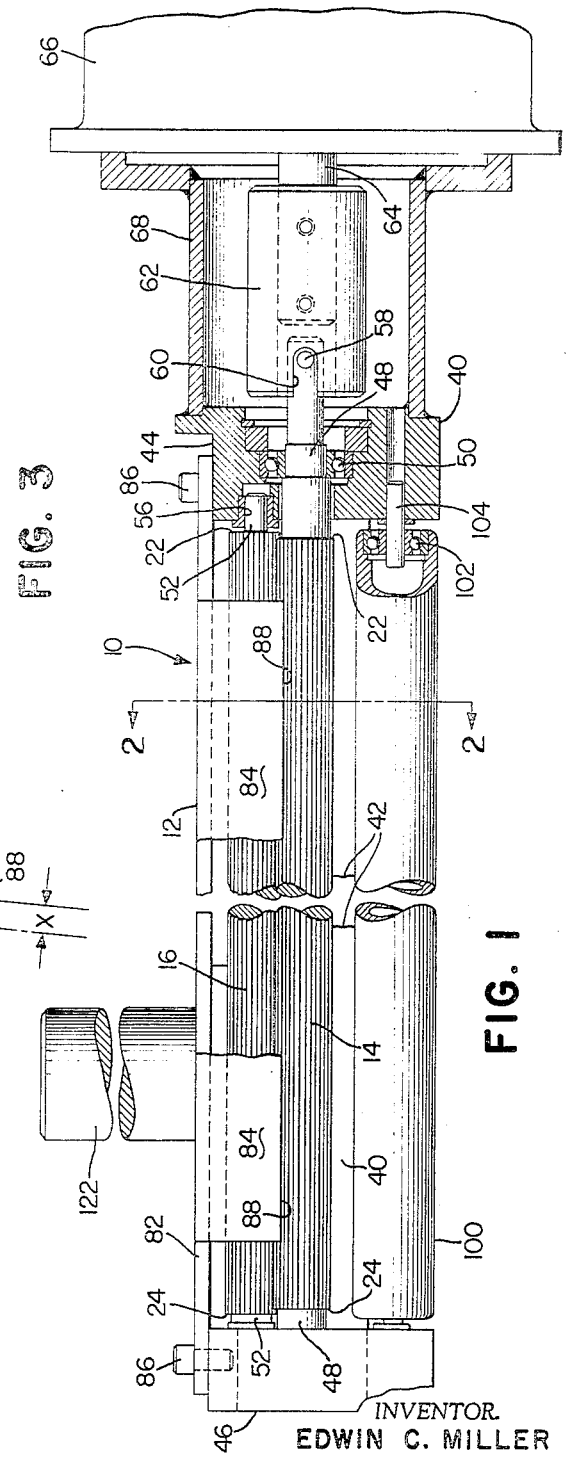
INVENTOR.
EDWIN C. MILLER
BY
*R. W. Washburn*
AGENT 3,483,911
TIRE TRIMMING DEVICE
Edwin C. Miller, La Vale, Md., assignor to The Kelly-Springfield Tire Company, Cumberland, Md., a corporation of Maryland
Filed Oct. 11, 1967, Ser. No. 674,397
Int. Cl. B29h 21/00, 17/00
U.S. Cl. 157—13                                                7 Claims

ABSTRACT OF THE DISCLOSURE

In apparatus for removal of vent projections from the surface of a tire, a device including a pair of flexible parallel toothed interengaging rollers grasp individual projections to snap or pick them from the tire surface with substantially no disfigurement or distortion of the tire body. Guide means such as a roller and/or a presser foot may contact the tire surface adjacent to the projection being removed.

---

The foregoing abstract is not to be taken as limiting the invention of this application, and in order to understand the full nature and extent of the technical disclosure of this application, reference must be made to the accompanying drawings and the following detailed description.

This invention relates to apparatus for removing projections from molded rubber articles, and more particularly for taking off from the surface of pneumatic tires and the like, projections formed thereon in the course of the molding operation as a result of flow of rubber into the air vents provided in the mold for the escape of air.

It is customary, in the molding of rubber articles such as pneumatic tires, to provide in the mold, small vent holes leading from the mold cavity through the body of the mold to the outside atmosphere. Such vent holes permit air and gases to be displaced more readily from the mold cavity by the rubber stock being molded, thereby facilitating the flow of rubber or rubber-like material into full and intimate contact with the surface of the mold cavity. In the course of the molding operation, some of the rubber stock, under the influence of heat and pressure, flows into the vent holes. When the molded tire or other article is removed from the mold, small bits of rubber molded in the vent holes project from the surface of the tire. These are considered objectionable and it is desirable that they be removed as completely as possible before the tire is sold.

In general, prior practice of removing the projections has been to trim the tire by cutting off or abrading away the projections. It has also been proposed heretofore to remove the undesired projections from the surface of the tire, or other molded article, by pulling such projections from the surface, and in particular by bringing the surface of the rubber article into engagement with a pair of closely spaced pinch rollers which are rotated in opposite directions in such a manner as to draw the projections between the rollers and away from the surface of the rubber article. Such a method and apparatus are disclosed by United States Patent No. 2,681,108 to Chanyi. The latter method has not come into general use because apparatus heretofore available provided no means for insuring that the projection to be removed would enter the nip between the pinch rolls to be removed thereby.

Accordingly, a principal object of the present invention is to provide improved apparatus overcoming the limitations and disadvantages heretofore obtained and capable of removing vent projections rapidly from tires, or the like, without injuring or disfiguring the same.

Other objects, features and advantages of the present invention will become apparent or be particularly pointed out in connection with the detailed description herein of the presently preferred embodiment and which description makes reference to the accompanying drawings, in which:

FIGURE 1 is a plan view of vent projection removal apparatus according to the present invention;

FIGURE 3 is an enlarged view of a portion of the apparatus shown in FIGURE 2;

The invention contemplates removal of vent projections or similar protrusions from the surface of the tire by gripping projections individually and successively between the converging teeth of a pair of intermeshing toothed rollers and exerting force on the projections sufficiently great in direction and magnitude that the projections are snapped off or broken away from the surface of the tire and so that the surface of the tire remains substantially undistorted.

The vent projections on tires are from .030 to .075 of an inch and usually about $\frac{1}{16}$ inch in diameter and extend in length outwardly from the surface of the tire from $\frac{1}{4}$ of an inch to 1 inch and more commonly from about $\frac{3}{8}$ inch to $\frac{1}{2}$ inch. The number and location of the individual vents are determined by the particular configuration of the tire but in any case will be provided more or less uniformly spaced around the circumference of the tire and transversely from the tread centerline to the bead on each of the two sides of the tire.

Figure 2:
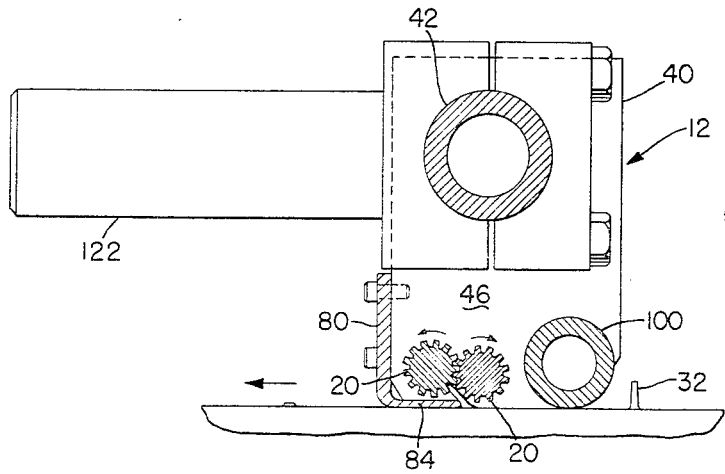
FIGURE 2 is a cross-sectional view (turned through 90°) of the apparatus of FIGURE 1 taken on the line 2—2 of FIGURE 1.

As shown in the drawings, particularly in FIGURES 1, 2 and 3 vent projection removal apparatus 10 according to the invention includes a trimming head or device 12 having a pair of parallel intermeshing toothed rollers 14 and 16 each having a plurality of lengthwise extending ridges of teeth 20 in rotationally driving engagement with likewise extending ridges of the other. Each of the rollers 14 and 16 is long and slender. The lengthwise ridges 20 are preferably conjugate one with another and have the cross-sectional form of conventional gear teeth, notatably as shown in FIGURE 3. Suitable stock having gear or spline teeth of the type desired can readily be obtained from commercial sources as pinion stock. In the instant embodiment the outside diameter of each roller 14, 16 is about $\frac{5}{8}$ inch. The length of each roller from shoulder 22 to shoulder 24 is about 14 inches, (and $14\frac{1}{2}$ and 15 inches respectively between the supporting bearings) giving a length to diameter ratio, $L/D$, of about 23 to 24. The $L/D$ ratio may be varied from as little as 16 to as much as 30 but preferably will be within the range of 20 to 25.

The number of lengthwise ridges on each of the intermeshing rollers may be from 8 to 20 or more, 14 teeth being provided in each of the rollers of the present embodiment. The depth of grooves or spaces 26 between the teeth of the rollers is advantageously greater than and may be approximately twice the normally expected thickness or diameter of the vent projections to be removed. The diameter of the rollers is sufficiently small so that the shortest vent projections will be gripped between the opposing ridges or teeth of the rollers as the teeth converge to enter the mesh where a tooth of one rollers enters the intervening space between adjacent teeth of the other roller. FIGURE 2 shows that a projection 32 appreciably shorter than the radius of either roller can be gripped by the teeth 20 entering upwardly into the mesh 30. Assurance is thereby provided that even the shortest of the vent projections can be gripped and removed from the tire surface by the device.

Long, slender, and therefore flexible rollers 14, 16 having the L/D ratio given herein permit elastic deflection of each of the rollers indicated by the phantom lines 34, 36 as the vent projections are passed through the mesh 30 and the nip 38 between the rollers 14 and 16. The elasticity or flexibility of the rollers 14, 16 provides that there will be a firm grip and that the projections will be snapped off from the tire surface as the rollers rotate, even though the tire surface and the surface of the projections be smooth or even slippery.

The device 12 provides a frame 40 including a main member in the form of a cylindrical bar or shaft 42 upon which the end housings 44 and 46 are mounted. End portions of the roller 14 axially outward from the vent projection engaging toothed portion and from shoulders 22 and 24 are reduced in diameter to provide journals 48 rotatably carried in bearings 50, seated in the housings 44, as shown in section in FIGURE 1, and in like manner in the housing 46. The journals 52 of the roller 16 are carried for rotation in bearings 56 seated similarly in the respective end housings 44, as shown in FIGURE 1, and 46. Bearings 50 and 56 are spaced to locate the rollers 14 and 16 in parallel, side by side, and intermeshing relation. The journal 48 is extended to receive a drive coupling pin 58 which engages a transverse slot 60 of a drive coupling 62 mounted upon the output shaft 64 of the driving means, or electric motor 66. The motor 66 is carried by a motor mount 68 attached to end housing 44 of the frame 40. In accordance with a feature of the invention the drive means 66 turns the first roller 14 at high speed, preferably not less than about 1500 r.p.m. A motor speed of about 3600 has been found suitable. The second roller 16 is driven only by its toothed interengagement with the first roller 14.

The invention alternatively includes guide means associated with the pair of toothed rollers 14 and 16, which serve both to position the device 12 with respect to the tire or article from which the vent projections are to be removed, to stabilize the surface of the tire and to insure against deformation or disfigurement of the tire. Guide means in the form of a shoe or presser foot 80 comprises a back portion 82 and foot portion 84 joined to the back portion to form an L cross-section of the presser foot. The back portion 82 extends from the end housing 44 to the end housing 46 and is secured suitably thereto as by the cap screws 86 so that the foot portion 84 will extend transversely from the back portion 82, longitudinally parallel to the pair of intermeshing rollers 14 and 16 and between the roller 16 and the surface of the tire from which the projections are to be removed. In accordance with a particular feature of the invention the presser foot extends from the back portion 82 outwardly to an edge 88 terminating at a line generally below the mesh 30 of the pair of rollers 14 and 16 and a distance $x$, preferably about $\frac{1}{16}$ inch, beyond the central plane $p$ of the mesh 30. The shoe or presser foot 80 is preferably brought into light contact with the surface of the tire from which the projections are to be removed and serves effectively to prevent distortion or damage to the article by providing direct resistance against the tension applied to the projection being removed. As will be apparent from FIGURE 3, the edge 88 of the presser foot 80 will engage the projections immediately adjacent the surface of the article as the projection is being removed by the action of the toothed rollers. The shoe 84 does not touch either of the rollers; rather it is so spaced from the rollers 14, 16 that no shearing or cutting off of the projections can occur.

Further guide means in the form of a roll 100 is disposed parallel and adjacent to the pair of toothed rollers so as to guide and support the surface of the tire or article as that surface is moved beneath the trimming device. The roller 100 is supported for rotation by a bearing 102 and a pin 104 secured in a bracket 106 which is suitably mounted for vertical adjustment on and with respect to the end housing 44. The other end of the roller 100 is similarly supported on and with respect to the end housing 46.

Figure 4:
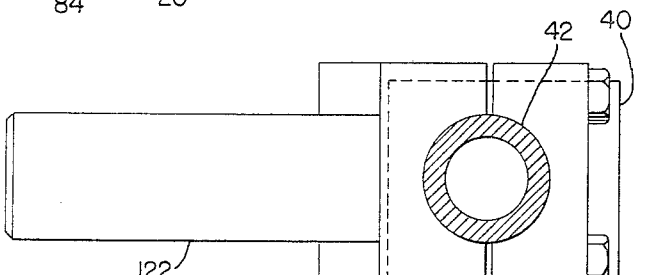
FIGURE 4 is a cross-sectional view of an alternative form of the apparatus according to the invention.

It will be appreciated upon inspection of FIGURES 2 and 4 that the shoe or presser foot 80 and a guide roll 110 may be substituted one for the other, the guide roll 110 being in all respects similar to and similarly mounted as the guide roll 100 previously described. The use of the guide means in the form of the pair of guide rollers 100 and 110 enables the positioning of the parallel pair of toothed rollers 14, 16 of the trimming device 12 precisely and stably with respect to the surface of the tire and the arrangement is particularly advantageous for use in trimming the more flexible surface portions of a tire, for example, the side wall. It is to be understood, however, that the flexible parallel intermeshing rollers 14 and 16, can be used alone, or without the presser foot 80 or roller 110.

Figure 5:
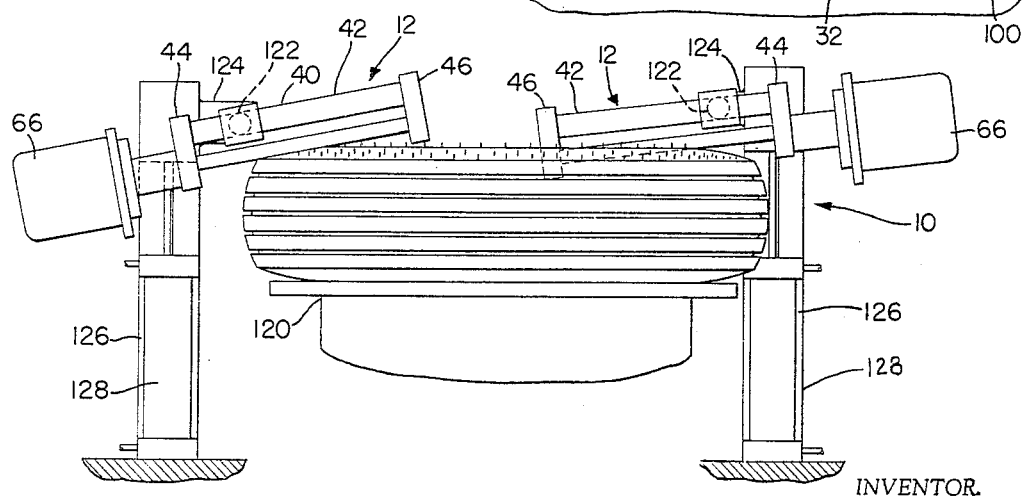
FIGURE 5 is an elevational view showing vent projection apparatus in accordance with the invention in operative relation with a tire having vent projections on its surface.

Illustrated in FIGURE 5, apparatus for removing projections from an elastomeric article such as a tire includes, according to the invention, one or more of the devices 12 hereinbefore described and means for positioning the device, or devices, with respect to a tire. By way of example, FIGURE 5 shows apparatus including a rotatable table 120 upon which a tire may be placed for rotation about its own normal rotational axis. To accommodate the device 12 at a suitable orientation to engage the vent projections on the surface of a tire or other article, a trunnion or stud 122 is clamped releasably onto the shaft 42 of the frame 40. As will be apparent from the drawings, the stud 122 can be located as desired along the bar 42 and at any suitable angular position thereon. The mounting stud 122 is adjustably secured to a cross head 124, the position of which is suitably adjusted to locate a tire and the device 12 in projection engaging and removing relation with one another. The apparatus includes a vertical column 126 carrying the cross head 124 upon which the trunnion 122 may be mounted. Means such as the fluid powered cylinder 128 may be actuated to raise and lower the device so as to bring the pair of flexible intermeshing toothed rollers of the device 12 into projection engaging contact with the appropriate surface of the tire as that surface is moved or rotated with respect to the rollers.

As will be apparent from the drawings and from the foregoing description, the device 12 may be positioned at any orientation so that projections, wherever located on the surface of the tire, may be suitably engaged for removal by one of the devices described. The movement of the tire successively positions the vent projections into engagement with a device having the parallel flexible intermeshing toothed rollers. The projections are rapidly and effectively removed with the consequent improvement in appearance of the tire.

The vent projection rollers 14 and 16 herein are described as being elastic or flexible. In the particular embodiment hereof the rollers are of steel, the proportions of length and diameter providing yieldability of the rollers sufficient to bow or bend slightly as the projection being grasped passes through the mesh or nip. The elastic deflection of one or both of the rollers, when constructed of materials other than steel will be accommodated by suitable adjustment of the length to diameter proportion or by other known equivalent means.

While certain representative embodiments and details have been shown for the purpose of illustrating the invention, it will be apparent to those skilled in this art that various changes and modifications may be made therein without departing from the spirit or scope of the invention.

What is claimed is:

1. In apparatus for removing projections from an elastomeric article such as a tire, the apparatus including a trimming device and means for positioning one of said tire and said device in projection engaging relation with the other, the improvement wherein said device includes a pair of parallel rollers each roller having a plurality of ridges extending along the projection engaging portion of said roller's length and in rotationally driving engagement with intermeshing ridges of the other of said rollers.

2. In apparatus as claimed in claim 1, the improvement wherein said rollers are elastically yieldable whereby said rollers are at least locally displaced relative to each other when a vent projection enters between said intermeshing ridges.

3. In apparatus as claimed in claim 1, the improvement wherein said ridges have a gear tooth form in cross-section, and at least one of said rollers has a length to diameter of 16 to 30.

4. In apparatus as claimed in claim 1, the further improvement comprising guide means mounted on said device for engagement with a surface portion of said article adjacent said projection engaging portion of said rollers.

5. In apparatus as claimed in claim 3, the further improvement wherein said guide means comprises a shoe having an outward edge parallel to said rollers along a line below the mesh of said rollers for engaging said projections immediately adjacent the surface of said article.

6. In apparatus as claimed in claim 3 the further improvement wherein said guide means comprising a plain roller rotatably mounted on said device and having its axis of rotation parallel to said rollers.

7. A device adapted for use in apparatus for removing vent projections from a tire or like molded elastomeric article, which device comprises a pair of yieldable toothed rollers mounted in parallel intermeshing relation, a frame supporting said rollers for rotation and having universally adjustable positioning means for supporting said device in said apparatus, and driving means connected in driving relation to one of said rollers.

References Cited

UNITED STATES PATENTS

| | | | |
|---|---|---|---|
| 1,440,397 | 1/1923 | McClenathen et al. | 157—13 |
| 2,681,108 | 6/1954 | Chanyi | 157—13 |
| 2,863,506 | 12/1958 | Skinner | 157—13 |
| 2,996,110 | 8/1961 | Bosomworth et al. | 157—13 |
| 3,075,574 | 1/1963 | Groves et al. | 157—13 |

GRANVILLE Y. CUSTER, JR., Primary Examiner